United States Patent [19]

Gulick

[11] Patent Number: 5,778,200
[45] Date of Patent: Jul. 7, 1998

US005778200A

[54] BUS ARBITER INCLUDING AGING FACTOR COUNTERS TO DYNAMICALLY VARY ARBITRATION PRIORITY

[75] Inventor: Dale E. Gulick, Austin, Tex.

[73] Assignee: Advanced Micro Devices, Inc., Sunnyvale, Calif.

[21] Appl. No.: 561,364

[22] Filed: Nov. 21, 1995

[51] Int. Cl.$^6$ ................................................ G06F 13/36
[52] U.S. Cl. ........................ 395/293; 395/296; 395/729
[58] Field of Search .................................. 395/287, 293, 395/296, 728, 729

[56] References Cited

U.S. PATENT DOCUMENTS

| | | | |
|---|---|---|---|
| 4,096,571 | 6/1978 | Vander Mey | 364/200 |
| 4,245,344 | 1/1981 | Richter . | |
| 4,339,808 | 7/1982 | North . | |
| 4,682,282 | 7/1987 | Beasley . | |
| 4,953,081 | 8/1990 | Feal et al. . | |

(List continued on next page.)

FOREIGN PATENT DOCUMENTS

| | | | |
|---|---|---|---|
| A 0 629 955 | 12/1994 | European Pat. Off. . | |
| 0 718 774 A1 | 6/1996 | European Pat. Off. . | |
| 2 165 726 | 4/1986 | United Kingdom | H04L 11/16 |
| 93/16434 | 8/1993 | WIPO . | |
| 95/28786 | 10/1995 | WIPO . | |

OTHER PUBLICATIONS

PCI Local Bus Multimedia Design Guide, Revision 1.0, Mar. 29, 1994, pp. 1–40.
Peripheral Component Interconnect (PCI) Revision 1.0 Specification, Jun. 22, 1992, cover page and pp. 26–33.
IBM Technical Disclosure Bulletin, vol. 35, No. 5, Oct. 1992, New York, US, pp. 1–3.
IBM Technical Disclosure Bulletin, vol. 31, No. 12, May 1989, New York, US, pp. 271–272.
IBM Technical Disclosure Bulletin, vol. 38, No. 4, Apr. 1995; New York, US, pp. 535–538, XP002016389, "Micro-Channel Architecture For Real–Time Multimedia".
IBM Technical Disclosure Bulletin, vol. 35, No. 5, Oct. 1992, New York, US, pp. 8–10, XP002016386, "Extended Microchannel for Realtime Multimedia Applications".
Patent Abstracts of Japan, vol. 14, No. 214 (P-1044), May 7, 1990 & JP, A, 02 048765 (NEC Corporation).

*Primary Examiner*—Jack B. Harvey
*Assistant Examiner*—Jigar Pancholi
*Attorney, Agent, or Firm*—Conley, Rose & Tayon; B. Noel Kivlin

[57] ABSTRACT

A computer system for controlling the ownership of a bus to which a variety of both real time and non-real time resources are coupled. The bus arbiter includes a request detection unit for detecting bus request signals of a plurality of bus masters, and a grant generator for generating corresponding grant signals to indicate a grant of ownership of the bus. A set of counters referred to as "aging factor" counters is further provided wherein a separate counter unit corresponds to each bus master. Each counter is configured to generate a signal indicative of a lapse of time since a time when the peripheral was last granted ownership of the bus. An arbitration control unit is coupled to the aging factor counters, the request detection unit and the grant generator for processing incoming bus request signals. The arbitration control unit is configured to dynamically vary the level of arbitration priority given to each peripheral device based upon the aging signal corresponding to the device. Accordingly, as a greater period of time elapses when a peripheral device last owned the bus, the greater the level of arbitration priority that is given to a bus request by that peripheral. A set of programmable registers are provided to allow software programming of the initial count value associated with each aging counter. The aging counter for a particular device may further be held or inhibited from counting to provide a constant level of priority for that particular peripheral device.

19 Claims, 3 Drawing Sheets

U.S. PATENT DOCUMENTS

| | | |
|---|---|---|
| 4,972,313 | 11/1990 | Getson, Jr. et al. . |
| 4,974,148 | 11/1990 | Matteson . |
| 5,146,596 | 9/1992 | Whittaker et al. . |
| 5,245,322 | 9/1993 | Dinwiddie, Jr. et al. . |
| 5,265,223 | 11/1993 | Brockmann et al. ............. 395/325 |
| 5,274,763 | 12/1993 | Banks . |
| 5,345,566 | 9/1994 | Tanji et al. . |
| 5,392,033 | 2/1995 | Oman et al. . |
| 5,396,602 | 3/1995 | Amini et al. . |
| 5,404,463 | 4/1995 | McGarvey . |
| 5,463,624 | 10/1995 | Hogg et al. . |
| 5,467,454 | 11/1995 | Sato ............................ 395/296 |
| 5,471,590 | 11/1995 | Melo et al. . |
| 5,524,235 | 6/1996 | Larson et al. . |
| 5,526,017 | 6/1996 | Wilkie . |
| 5,533,205 | 7/1996 | Blackledge, Jr. et al. . |
| 5,535,341 | 7/1996 | Shah et al. . |
| 5,546,546 | 8/1996 | Bell et al. . |
| 5,572,686 | 11/1996 | Nunziata et al. ............. 395/296 |
| 5,574,867 | 11/1996 | Khaira . |
| 5,583,999 | 12/1996 | Sato et al. .................... 395/280 |

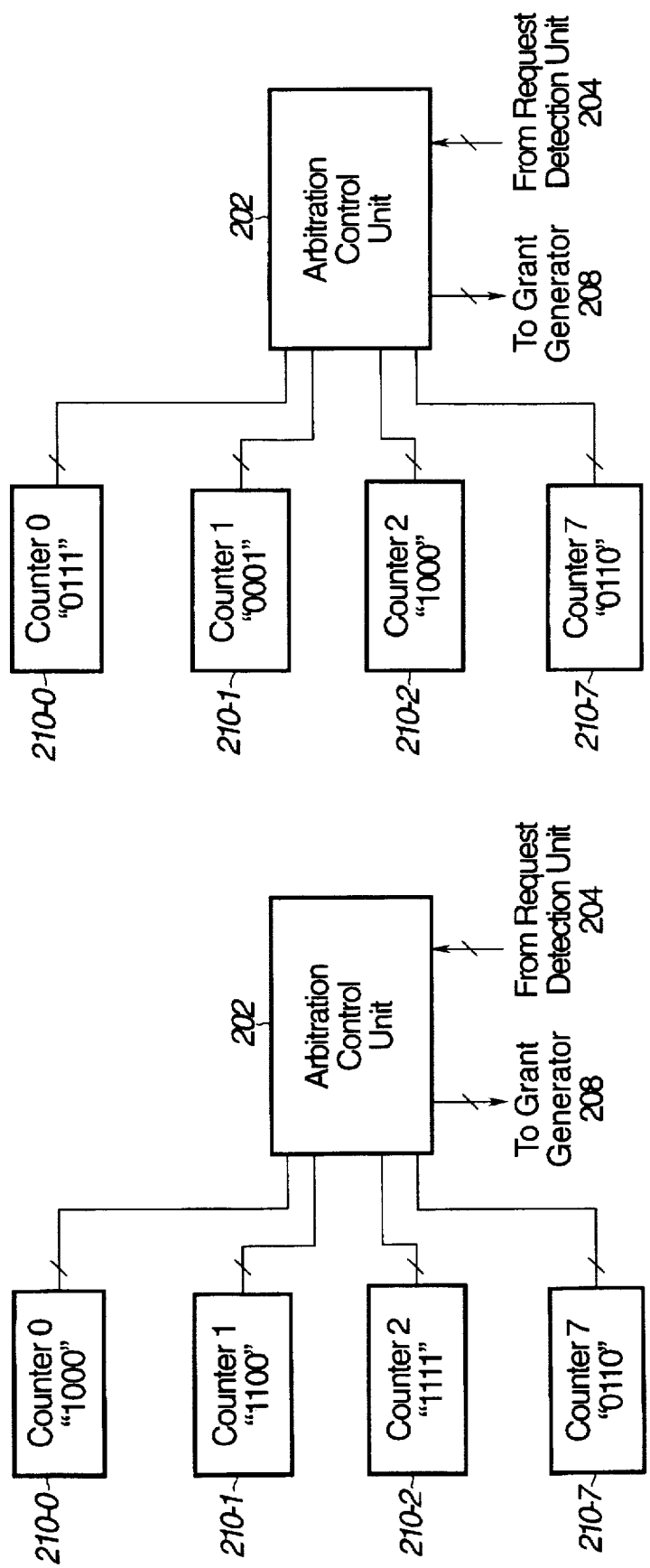

BUS ARBITER INCLUDING AGING FACTOR COUNTERS TO DYNAMICALLY VARY ARBITRATION PRIORITY

BACKGROUND OF THE INVENTION

1. Field of the Invention

This invention relates to bus arbitration within computer systems and, more particularly, to a computer system having an improved bus arbiter for arbitrating bus accesses of a CPU, real time DSP hardware, and other system resources.

2. Description of the Relevant Art

Computer architectures generally include a plurality of devices interconnected by one or more buses. For example, conventional computer systems typically include a CPU coupled through bridge logic to a main memory. The bridge logic also typically couples to a high bandwidth local expansion bus, such as the Peripheral Component Interconnect (PCI) bus or the VESA (Video Electronics Standards Association) VL bus. Modern local bus standards such as the PCI bus and the VL bus are not constrained by a requirement to be backwards compatible with prior expansion bus adapters and thus provide much higher throughput than older expansion buses. Examples of devices which can be coupled to local expansion buses include SCSI adapters, network interface cards, video accelerators, audio cards, telephony cards, etc. An older-style expansion bus may also be coupled to the local expansion bus to provide compatibility with earlier-version expansion bus adapters. Examples of such expansion buses include the industry standard architecture (ISA) bus, also referred to as the AT bus, the extended industry standard architecture (EISA) bus, and the microchannel architecture (MCA) bus. Various devices may be coupled to this second expansion bus, including a fax/modem, sound card, etc.

A CPU local bus arbiter as well as a PCI bus arbiter are typically included as part of the bridge logic in many computer systems. The CPU local bus arbiter determines and prioritizes ownership of the CPU local bus, while the PCI bus arbiter determines and prioritizes ownership of the PCI bus. Mastership of either bus is typically based on a fixed arbitration fairness scheme, such as a round-robin algorithm. In some situations, a master must acquire ownership of both the PCI bus and the CPU local bus before it can proceed with a particular transfer cycle.

Computer systems were originally developed for business applications including word processing and spreadsheets, among others. Recently, computer systems have evolved toward more real time applications, including multimedia applications such as video and audio, video capture and playback, telephony, and speech recognition. Computer systems originally designed for business applications, however, are not well suited for the real time requirements of modern multimedia applications for a variety of reasons. For example, current operating systems for personal computers are not real time operating systems. In addition, the bus architecture of modern personal computer systems still presumes that the majority of applications executing on the computer system are non-real time, business applications such as word processing and/or spreadsheets which are executed solely by the main CPU.

A significant problem associated with modern computer systems is that the bus arbiter which arbitrates between real time resources, non-real time resources and the CPU is typically designed to provide the CPU with maximum availability to the system memory, or is otherwise not cognizant of the real time accesses of other bus mastering devices. Real time devices can accordingly be "starved" for memory access, particularly when a relatively large number of real time devices are included within the system. This can correspondingly result in degraded performance, unsynchronized audio and video, and the dropping of frames during video or animation sequences. Therefore, a new bus arbiter system and method are desirable which provide greater access to bus subsystems by real time devices to thus better facilitate real time applications.

SUMMARY OF THE INVENTION

The problems outlined above are in large part solved by a bus arbiter including aging factor counters to dynamically vary arbitration priority in accordance with the present invention. In one embodiment, a computer system is provided for controlling the ownership of a bus to which a variety of both real time and non-real time resources are coupled. The bus arbiter includes a request detection unit for detecting bus request signals of a plurality of bus masters, and a grant generator for generating corresponding grant signals to indicate a grant of ownership of the bus. A set of counters referred to as "aging factor" counters is further provided wherein a separate counter unit corresponds to each bus master. Each counter is configured to generate a signal indicative of a lapse of time since a time when the peripheral was last granted ownership of the bus. An arbitration control unit is coupled to the aging factor counters, the request detection unit and the grant generator for processing incoming bus request signals. The arbitration control unit is configured to dynamically vary the level of arbitration priority given to each peripheral device based upon the aging signal corresponding to the device. Accordingly, as a greater period of time elapses when a peripheral device last owned the bus, the greater the level of arbitration priority that is given to a bus request by that peripheral. A set of programmable registers are provided to allow software programming of the initial count value associated with each aging counter. The aging counter for a particular device may further be held or inhibited from counting to provide a constant level of priority for that particular peripheral device. Since the level of arbitration priority given to the various peripheral devices may be based upon a lapse of time from when each peripheral last had ownership of the bus, improved overall system performance may be obtained, particularly for real time processing environments.

Broadly speaking, the present invention contemplates a bus arbiter for controlling and prioritizing ownership of a bus comprising a request detection unit for detecting a plurality of bus request signals corresponding to designated bus masters; a grant generator for generating a plurality of bus grant signals; an arbitration control unit coupled the request detection unit and to the grant generator, wherein the arbitration control unit is configured to process contending bus requests received by the request detection unit; and a first counter unit coupled to the arbitration control unit wherein the first counter unit is configured to generate a first aging signal indicative of a first lapse of time following a grant of mastership of the bus to a designated peripheral device; wherein the arbitration control unit is further configured to increase a level of arbitration priority given to the designated peripheral device in response to the aging signal indicating an increase in the first lapse of time.

BRIEF DESCRIPTION OF THE DRAWINGS

Other objects and advantages of the invention will become apparent upon reading the following detailed description and upon reference to the accompanying drawings in which:

FIGS. 3A and 3B are diagrams illustrating portions of the bus arbiter of FIG. 2 which illustrate exemplary values generated by the counters of various peripheral devices.

Figure 1:
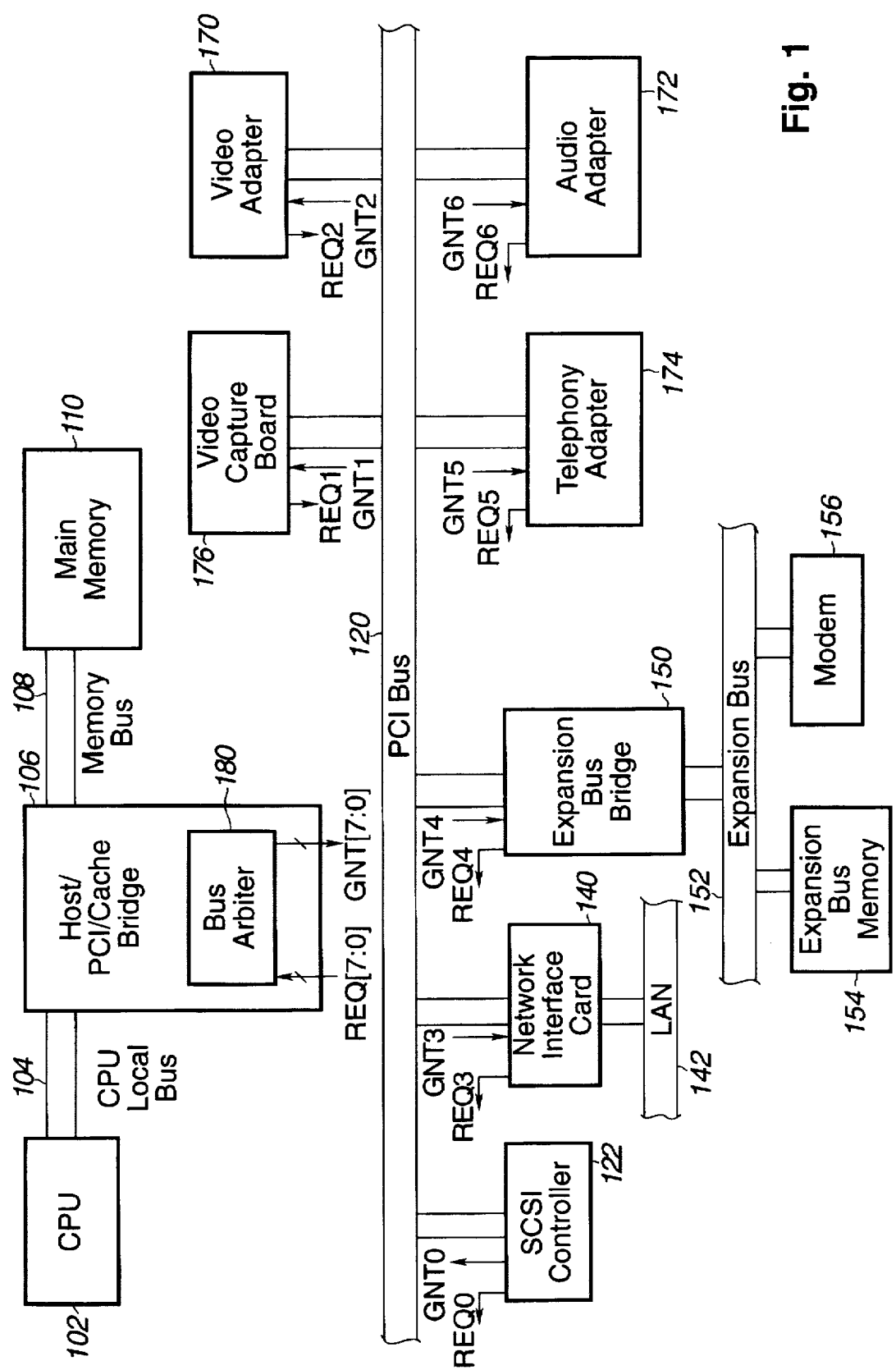
FIG. 1 is a block diagram of a computer system including a variety of real time resources and a bus arbiter in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to FIG. 1, a block diagram of a computer system incorporating a plurality of real time bus devices and bus arbitration logic in accordance with the present invention is shown. As illustrated in the figure, the computer system includes a central processing unit (CPU) 102 which is coupled through a CPU local bus 104 to a host/PCI/cache bridge 106. The bridge 106 includes memory control logic and is coupled through a memory bus 108 to a main memory 110. A cache memory subsystem (not shown) may further be coupled to bus bridge 106.

Bus bridge 106 also interfaces to a peripheral component interconnect (PCI) bus 120. Further details regarding PCI bus 120 may be found within the publication "PCI Local Bus Specification"; Revision 2.0; Apr. 30, 1993; PCI Special Interest Group; Hillsboro, Oreg. This publication is incorporated herein by reference in its entirety. It is noted that other local buses could be alternatively employed, such as the VESA (Video Electronics Standards Association) VL bus.

CPU 102 is illustrative of, for example, an x86 microprocessor such as an 80486 microprocessor or a Pentium-compatible microprocessor. It is understood, however, that a system according to the present invention may employ other types of microprocessors. It is further understood that the present invention may be employed within a multiprocessing environment.

Various types of devices may be connected to the PCI bus 120. For the embodiment illustrated in FIG. 1, a video adapter 170 for controlling video functions is coupled to PCI bus 120. Other real time DSP devices are also preferably coupled to the PCI bus, including an audio adapter 172, a telephony adapter 174, and a video capture board 176, among others. A SCSI (small computer systems interface) disk controller 122 and a network interface card 140 are additionally shown coupled to the PCI bus 120. SCSI controller 122 is configured to provide an interface to SCSI devices such as a CD-ROM device, a tape drive device, and/or a composite disk array. The network interface card 140 interfaces to a local area network (LAN) 142.

An expansion bus bridge 150 is also preferably coupled to the PCI bus 120. The expansion bus bridge 150 interfaces to an expansion bus 152. The expansion bus 152 may be any of a variety of types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156.

A bus arbiter 180 configured to control ownership of PCI bus 120 is illustrated as a portion of bus bridge 106. The arbitration scheme employed by PCI bus 120 employs a unique request signal REQ# and grant signal GNT# for each PCI master. When a particular master desires ownership of PCI bus 120, it asserts its associated request signal REQ#. For example, request signal REQ2 is asserted by video adapter 170 when it requires ownership of PCI bus 120, and request signal REQ5 is asserted by telephony adapter 174 when it requires ownership of PCI bus 120, and so on. Corresponding grant signals GNT[7:0] are routed back to the masters from bus arbiter 180 to indicate the current owner of PCI bus 120. Each request signal/grant signal pair is referred to as a bus request channel. It is noted that request signal REQ4 may be asserted by expansion bus bridge 150 if access of PCI bus 120 is required by an agent of expansion bus 152, such as modem 156.

In accordance with the invention, bus arbiter 180 is configured to dynamically vary a level of arbitration priority provided to a peripheral device based upon a lapse of time from when the peripheral device last owned PCI bus 120. As a lapse of time increases from when the peripheral device owned the bus, the level of arbitration priority for that peripheral increases. The bus arbiter 180 is further configured such that certain peripheral devices may be assigned a fixed level of priority. Further details regarding bus arbiter 180 will be provided below in conjunction with the accompanying descriptions of FIGS. 2, 3A and 3B.

Figure 2:
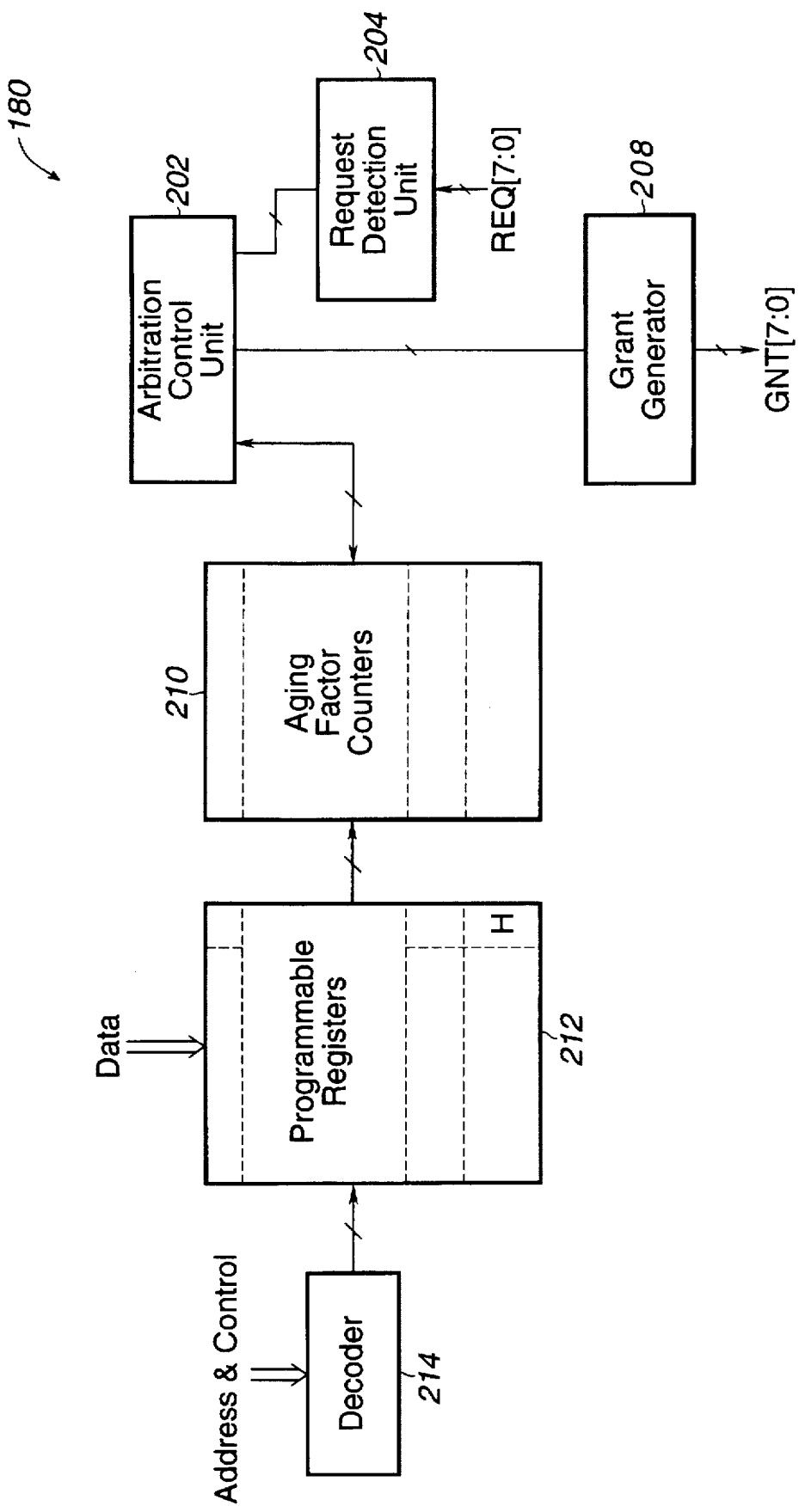
FIG. 2 is a block diagram which depicts internal portions of the bus arbiter of FIG. 1.

FIG. 2 is a diagram that depicts internal portions of bus arbiter 180. As shown, bus arbiter 180 includes an arbitration state machine 202 coupled to a request detection unit 204, a grant generator 208 and an aging factor counters unit 210. A set of programmable registers 212 are further coupled between aging factor counters unit 210 and a decoder 214.

Aging factor counters unit 210 generates signals indicative of a lapse of time from which certain masters of PCI bus 120 last owned the bus. FIGS. 3A and 3B illustrate one embodiment wherein a plurality of counters 210-0 through 210-7 are incorporated within aging factor counters unit 210. Each counter unit 210-0 through 210-7 corresponds to a different master of PCI bus 120, and is associated with a separate bus request channel (i.e., counter unit 210-0 corresponds to request signal REQ0, etc.). Additional counter units may further be incorporated within aging factor counters unit 210 for additional peripheral devices, as desired. Similarly, certain peripheral devices may not be associated with a counter unit, and thus fewer counter units may be employed.

Programmable registers 212 are provided to set and store the initial count value of each of the counters of aging factor counters unit 210. The decoder 214 is provided to allow software programming of programmable registers 212. A separate storage region (shown in phantom in FIG. 2) is provided to set the initial count value of each counter unit. Programmable registers 212 may be mapped within the memory space, the I/O space, or the configuration space of the computer system.

Arbitration control unit 202 is provided to process incoming bus request signals detected by request detection unit 204, to prioritize contending requests, and to cause grant generator 208 to assert a grant signal to the winning master. Arbitration control unit 202 is configured such that the level of priority given to each master is dependent upon a corresponding count value of the counter unit associated with the master. The closer a particular counter unit is to a value of 0, the higher the priority level given by arbitration control unit 202. Different initial count values may be set for different counter units. For example, FIG. 3A illustrates a situation wherein the initial value of counter 210-0 is binary "1000", the initial value of counter 210-1 is binary "1100", the initial value of counter 210-2 is binary "1111" and the initial value of counter 210-7 is binary "0110". As stated previously, the initial values of each counter is set by corresponding registers within programmable registers 212. Thus, for the moment in time when the values of counters 210 are as illustrated in FIG. 3 (and disregarding any other counters), arbitration control unit 202 assigns a highest level of priority to the request signal REQ7, since counter 210-7 conveys the lowest binary value. The second highest level of arbitration priority given to request signal REQ0, which corresponds to counter 210-0. Similarly, the next level of arbitration of priority is given to request signal REQ1, which is associated with counter 210-1, and request signal REQ2 is given the lowest priority.

Each of the counters 210-0 through 210-7 is configured to count down from its initial value following a time when the corresponding master last owned the bus. If a request by a particular master is granted, the counter corresponding to that master is reset to its initial value, and again begins counting down when bus mastership terminates.

Each of the counters of aging factor counters unit 210 may be inhibited from counting by setting an associated hold bit within the corresponding storage region of programmable registers 212. When the hold bit for a particular counter unit is set, it retains its initial value programmed within programmable registers unit 212. Thus, a fixed level of arbitration priority may be set for selected peripheral devices, as desired. For example, it may be desirable to inhibit the counter unit of certain non-real time peripheral devices to set a fixed level of arbitration priority to the peripheral.

FIG. 3B illustrates an exemplary situation during the operation of the system wherein counter 210-0 has counted down to binary "0111", counter 210-1 has counted down to binary value "0110", and counter 210-2 has counted down to binary value "1000". For this example, the "hold" bit associated with counter 210-7 was set, and thus the initial binary value of "0110" is maintained. For the moment in time as depicted in 3B, request signal REQ1 is given the highest level of arbitration priority since its count value is lowest. The next level of arbitration priority is provided to request signal REQ7, and so on. Thus, it is noted that for this moment in time, if the master associated with request signal REQ1 requires the bus, it will be provided first priority over any other contending masters. When the master is granted the bus, counter 210-1 is reset to its initial value of binary "1100", and resumes its count down after ownership of the bus is terminated.

In accordance with the system described above, the counter units associated with real time bus masters which require frequent access to the bus may be programmed with an initial program value which is relatively low. The counter units associated with real time bus masters which require less frequency accesses to the bus may be programmed with initial count values which are higher. The initial count values of the counter units can thus be correlated to the frequency at which real time bus masters require bus access. The counter units associated with non-real time bus masters may be inhibited from counting to provide a fixed level of arbitration priority. As a result, overall improved system performance may be attained.

Numerous variations and modifications will become apparent to those skilled in the art once the above disclosure is fully appreciated. It is intended that the following claims be interpreted to embrace all such variations and modifications.

What is claimed is:

1. A bus arbiter for controlling and prioritizing ownership of a bus comprising:
    a request detection unit for detecting a plurality of bus request signals corresponding to designated bus masters;
    a grant generator for generating a plurality of bus grant signals;
    an arbitration control unit coupled to said request detection unit and to said grant generator, wherein said arbitration control unit is configured to process contending bus requests received by said request detection unit; and
    a first counter unit coupled to said arbitration control unit wherein said first counter unit is configured to generate a first aging signal indicative of a first lapse of time following a termination of mastership of said bus to a designated peripheral device;
    wherein said arbitration control unit is further configured to increase a level of arbitration priority given to said designated peripheral device in response to said aging signal indicating an increase in said first lapse of time.

2. The bus arbiter as recited in claim 1 further comprising a second counter unit coupled to said arbitration control unit wherein said second counter unit is configured to generate a second aging signal indicative of a second lapse of time following a termination of mastership of said bus to a second peripheral device.

3. The bus arbiter as recited in claim 2 wherein said arbitration control unit is configured to increase a level of arbitration priority given to said second peripheral device in response to said second aging signal indicating an increase in said second lapse of time.

4. The bus arbiter as recited in claim 3 further comprising a programmable storage unit configured to store a first initial count value for said first counter unit and a second initial count value for said second counter unit.

5. The bus arbiter as recited in claim 4 wherein said programmable storage unit includes a plurality of registers.

6. The bus arbiter as recited in claim 4 wherein said programmable storage unit is further configured to store a bit to inhibit said first counter unit from counting.

7. The bus arbiter as recited in claim 5 wherein each of said plurality of said registers is configured to store a parameter that controls whether an associated counter unit is inhibited from counting.

8. The bus arbiter as recited in claim 4 further comprising a decoder coupled to said programmable storage unit, wherein said decoder is configured to decode an address signal to thereby allow a setting of said first initial count value stored within said programmable storage unit.

9. A computer system comprising:
    a microprocessor;
    a bus bridge coupled to said microprocessor through a CPU local bus;
    an expansion bus coupled to said bus bridge, wherein said bus bridge is configured to accommodate data transfers between said CPU local bus and said expansion bus;
    a real time master coupled to said expansion bus, wherein said real time master is configured to perform real time processing functions;

a non-real time master coupled to said expansion bus, wherein said non-real time master is configured to perform non-real time processing functions; and a bus arbiter for controlling and prioritizing ownership of said expansion bus including:

a request detection unit for detecting a first request signal of said real time master and a second request signal of said non-real time master;

a grant generator for generating a plurality of bus grant signals;

an arbitration control unit coupled to said request detection unit and to said grant generator, wherein said arbitration control unit is configured to process contending bus requests received by said request detection unit; and a first counter unit coupled to said arbitration control unit wherein said first counter unit is configured to generate a first aging signal indicative of a first lapse of time following a termination of mastership of said expansion bus to real time master;

wherein said arbitration control unit is further configured to increase a level of arbitration priority given to said real time master in response to said aging signal indicating an increase in said first lapse of time.

10. The computer system as recited in claim 9, wherein said real time master is configured to assert a first request signal to request ownership of said expansion bus and wherein said non-real time master is configured to assert a second request signal to request ownership of said expansion bus.

11. The computer system as recited in claim 9 wherein said expansion bus is a PCI bus.

12. The computer system as recited in claim 9 wherein said real time master is an audio adapter.

13. The computer system as recited in claim 9 further comprising a second counter unit coupled to said arbitration control unit wherein said second counter unit is configured to generate a second aging signal indicative of a second lapse of time following a termination of mastership of said expansion bus to said non-real time master.

14. The computer system as recited in claim 13 wherein said arbitration control unit is configured to increase a level of arbitration priority given to said non-real time master in response to said second aging signal indicating an increase in said second lapse of time.

15. The computer system as recited in claim 14 further comprising a programmable storage unit configured to store a first initial count value for said first counter unit and a second initial count value for said second counter unit.

16. The computer system as recited in claim 15 wherein said programmable storage unit includes a plurality of registers.

17. The computer system as recited in claim 15 wherein said programmable storage unit is further configured to store a bit to inhibit said first counter unit from counting.

18. The computer system as recited in claim 16 wherein each of said plurality of said registers is configured to store a parameter that controls whether an associated counter unit is inhibited from counting.

19. The computer system as recited in claim 15 further comprising a decoder coupled to said programmable storage unit, wherein said decoder is configured to decode an address signal to thereby allow a setting of said first initial count value stored within said programmable storage unit.

* * * * *